United States Patent Office 3,389,112
Patented June 18, 1968

---

3,389,112
UNSATURATED CYCLIC ACETALS AND POLYMERS THEREOF
John D. Nordstrom, Minneapolis, Minn., assignor to Ashland Oil & Refining Company, Ashland, Ky., a corporation of Kentucky
No Drawing. Filed Jan. 29, 1965, Ser. No. 429,114
20 Claims. (Cl. 260—30.4)

ABSTRACT OF THE DISCLOSURE

Bifunctional cyclic acetals having the formulas:

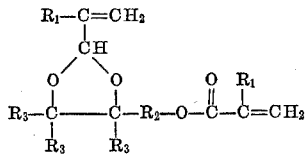

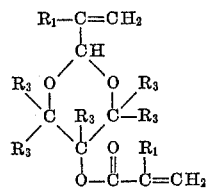

and

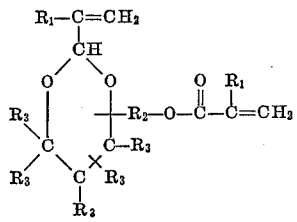

wherein $R_1$ is a radical selected from the class consisting of hydrogen and the methyl group, $R_2$ is an alkylene radical of 1 to 18 carbon atoms, and $R_3$ is a radical selected from the class consisting of hydrogen and alkyl radicals having from 1 to 8 carbon atoms, are prepared by reaction of unsaturated compounds having the formula $CH_2=CHR_1COX$ wherein X is a chlorine, hydroxyl, or lower alkoxy group with a cyclic acetal. The bifunctional cyclic acetals are polymerizable to polymeric materials suitable as coating resin vehicles.

---

The present invention relates to novel unsaturated acetals and polymers thereof, and more particularly to unsaturated acetals and polymers thereof which, as a result of their unique structure have advantageous properties making them particularly useful in the preparation of surface coating materials.

Most resinous coating materials contain active groups in the polymer structure which can be employed to cross-link the resin after application in order to impart the necessary properties of chemical inertness and physical toughness. Resinous coating compositions which can be air dried to a cross-linked coating generally employ a second monomer to achieve such cross-linking. A preferred monomer used for this purpose is styrene, since the preferred reactive group retained in the polymeric composition is usually an ethylenically unsaturated double bond. The cross-linking reaction of the added unsaturated monomer is usually initiated by the addition of a free radical forming compound such as a peroxide. The use of such added monomer in the coating composition is generally disadvantageous since the monomers that are useful for cross-linking, commonly also referred to as curing or hardening, are volatile and have a tendency to evaporate from the coating before complete cross-linking can be accomplished. Although this evaporation does not cause the total removal of the monomer used for the cross-linking reaction, the loss of such monomer is difficult to anticipate since it depends on the particular coating conditions which may vary widely and thus does not permit the desired control over the cross-linking reaction which is necessary in order to obtain optimum physical and chemical properties from the coating. The use of difunctional monomers which are capable of polymerizing and cross-linking so as to avoid the need of adding a cross-linking monomer, is also subject to certain disadvantages when employing the difunctional monomers known heretofore. In order to obtain rapid curing cycles and outstanding physical properties in the coating, it is generally necessary to employ resinous materials which, although soluble in organic solvents, contain polymer molecules of high polymerization degrees. The use of monomers which contain two or more unsaturated groups capable of polymerization as well as cross-linking without the addition of a curing monomer, however, results in premature cross-linking before the necessary molecular weights for good coating properties are reached. Hence, resinous coating compositions which contain built-in curing means have not found wide utility.

It is, therefore, one of the objects of the present invention to provide monomeric materials which can be polymerized to coating resins and which do not require the use of additional monomer to cause cross-linking of the coating resin.

It is another object of the present invention to provide novel monomeric compounds which contain two vinyl groups capable of being polymerized by different polymerization techniques for each vinyl group.

Still another object of the present invention is to provide novel coating compositions which have sufficiently low viscosity to be applied by common coating techniques without dilution by inert solvents and are essentially non-volatile and odorless.

A further object of the present invention is to provide coating compositions which can be air dried rapidly without the use of added volatile monomers and on cross-linking are resistant to organic solvents as well as to scratching and marring.

Yet another object of the present invention is to provide novel monomeric compounds which themselves can be used as cross-linking agents for resinous coating compositions.

Other objects of the present invention will become apparent from the following description and claims.

The novel, bifunctional cyclic acetals of the present invention have the following general formula:

I   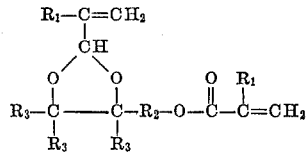

II  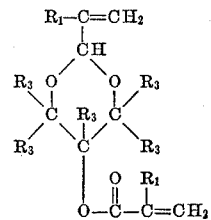
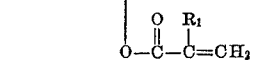

and

III 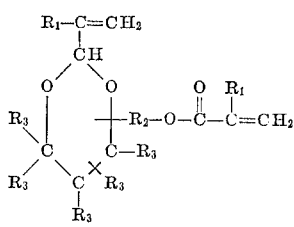

in which $R_1$ is a radical selected from the class consisting of hydrogen and the methyl group, $R_2$ is an alkylene radical of one to eighteen carbon atoms, and $R_3$ is a radical selected from the class consisting of hydrogen and alkyl radicals having from one to eight carbon atoms.

In accordance with the present invention, it was discovered that the bifunctional cyclic acetals described in Formulas I, II, and III are capable of polymerization through the alkenyl acetal group while leaving the unsaturated acid group substantially unaffected by the use of ionic catalysts. It was further discovered that both the alkenyl acetal group and the unsaturated acid group are polymerized by free radical catalysts. The selective polymerization of the alkenyl acetal group by means of ionic catalysts imparts a highly valuable, unique property to the cyclic acetals of the present invention. Their ability to polymerize selectively through the alkenyl group permits the formation of highly unsaturated and yet un-cross-linked polymeric materials which are extremely desirable for coating compositions since they are low viscosity liquids that can be employed directly as coating vehicles and can be cross-linked without the use of added monomers. The polymeric cyclic acetals of the present invention furthermore are also soluble in organic solvents.

The novel cyclic acetals of the present invention are preferably prepared by transesterification of cyclic acetals containing a hydroxyl group instead of the $$CH_2=CR_1-CO_2-$$

acid group shown in the Formulas I, II, and III with an ester of acrylic or methacrylic acid. In general, methyl or ethyl, or similar lower alkyl acrylates or methacrylates are employed since the resulting alcohol can be readily volatilized from the reaction mixture as is necessary to achieve the transesterification. Transesterification reactions are well known in the art and are generally carried out at elevated temperatures to allow the alcohol formed from the ester employed to be volatilized and removed from the reaction mixture comprising the cyclic acetal, alcohol and the unsaturated ester. Although the reaction can be carried out in the absence of catalysts, the use of such results in higher yields. Alkali metal alkoxides are generally employed as catalysts for the reaction. Such alkali metal alkoxides can be formed in situ from the alcohol present in the reaction mixture or an added alcohol and an added finely dispersed alkali metal. Particularly preferred transesterification catalysts are sodium methylate and ethylate. If desired the reaction can be carried out at reduced pressures. The desired bifunctional cyclic acetal is obtained by distillation from the reaction mixture. In general it is preferred to employ an excess of the acrylic or methacrylic acid ester, even though the cyclic acetal and the unsaturated ester react in equimolar amounts. In view of the high reactivity of the unsaturated acid group, stray free radicals which may be present in or are introduced into the reaction mixture can cause the polymerization of the unsaturated ester prior to reaction with the cyclic acetal or can cause the novel bifunctional acetal to polymerize. Such premature polymerization of the unsaturated acid group is readily inhibited by the use of known polymerization inhibitors for the acid group such as hydroquinone and similar compounds which do not interfere in the transesterification. Other suitable inhibitors include di-β-naphthol, tertiary butyl catechol, pyrogallol, and the like. Although the transesterification reaction is preferred in the formation of the novel cyclic acetals of the present invention, it is to be understood that the direct esterification of methacrylic acid or acrylic acid with the cyclic acetal alcohols can similarly be employed. In still another method the cyclic acetal alcohol can be reacted with the unsaturated acid chloride.

The cyclic acetal containing the hydroxyl group is prepared by the reaction of acrolein or methacrolein with a triol. The triols employed in the formation of the novel cyclic acetals of the present invention contain two hydroxyl groups on adjacent carbon atoms if it is desired to form the dioxolane ring containing cyclic acetal and two hydroxyl groups on carbon atoms which are removed from each other by a third carbon atom if it is desired to form the dioxane ring containing cyclic acetal. Suitable triols therefore include glycerol, 1,2,4-butanetriol,
1,2,5-pentanetriol,
1,3,5-pentanetriol,
1,2,6-hexanetriol,
2,3,6-hexanetriol,
1,3,6-hexanetriol,
2-methyl-1,2,5-pentanetriol,
2-methyl-2,3,6-hexanetriol,
1,3,7-heptanetriol,
1,2,7-heptanetriol,
1,2,8-octanetriol,
2,4,4-trimethyl-1,2,5-pentanetriol,
1,2,10-decanetriol,
1,3,10-decanetriol,
2,4,10-decanetriol,
1,3,8-octanetriol,
2,3,8-octanetriol,
3,4,8-octanetriol,
2,3-dimethyl-2,3,8-octanetriol,
1,2,5-hexanetriol,
2-methyl-1,2,6-heptanetriol,
2,3,9-decanetriol,
2-methyl-2,4,8-nonanetriol, and the like.

The reaction of the acrolein, or methacrolein, with the triol is conveniently carried out by heating a mixture of the unsaturated aldehyde and the triol containing preferably an excess of the aldehyde over the stoichiometric requirement for the reaction dissolved or suspended in a suitable liquid such as benzene or trichloroethylene, etc. The reaction is generally carried out under conditions which allow the removal of water formed by the cyclization. The reaction is catalyzed by an acid catalyst and particularly by a sulfuric acid catalyst such as sulfuric acid, toluene sulfonic acid, benzene sulfonic acid, ethane sulfonic acid, and the like. The acid is employed in concentrations of 0.01 to 0.1 mole percent based on the unsaturated aldehyde present.

Novel cyclic acetals produced by the two-step process hereinabove described include therefore such dioxolanes as 2-(2-vinyl-1,3-dioxolan(4)yl) ethyl methacrylate,
2-vinyl-1,3-dioxolan(4)yl methyl methacrylate,
4-(2-vinyl-1,3-dioxolan(4)yl) butyl methacrylate,
4-(2-vinyl-5-methyl-1,3-dioxolan(4)yl) butyl methacrylate,
2-(2-vinyl-5-methyl-1,3-dioxolan(4)yl) ethyl methacrylate,
2-vinyl-5-ethyl-1,3-dioxolan(4)yl methyl methacrylate,
4-(2-vinyl-5,5-dimethyl-1,3-dioxolan(4)yl) butyl methacrylate,
4-(2-vinyl-1,3-dioxolan(4)yl) butyl acrylate,
6-(2-vinyl-1,3-dioxolan(4)yl) hexyl acrylate,
8-(2-vinyl-1,3-dioxolan(4)yl) octyl acrylate,
2-isopropenyl-1,3-dioxolan(4)yl methyl methacrylate,
4-(2-isopropenyl-1,3-dioxolan(4)yl) butyl methacrylate,
2-(2-isopropenyl-1,3-dioxolan(4)yl) isopropyl acrylate, 2-(2-isopropenyl-5-ethyl-1,3-dioxolan(4)yl) ethyl acrylate,
4-(2-isopropenyl-5,5-dimethyl-1,3-dioxolan(4)yl) butyl methacrylate,
2-isopropenyl-5-isopropyl-1,3-dioxolan(4)yl methyl methacrylate,
4-(2-vinyl-4,5-dimethyl-1,3-dioxolan(4)yl) butyl methacrylate, and the like.

Novel dioxanes produced by the described synthesis process include 2-vinyl-1,3-dioxan(5)yl methacrylate, 2-vinyl-1,3-dioxan(4)yl methyl methacrylate, 4-(2-vinyl-1,3-dioxan(4)yl) butyl methacrylate, 2-isopropenyl-1,3-dioxan(5)yl methacrylate, 2-isopropenyl-1,3-dioxan(4)yl methyl methacrylate, 4-(2-vinyl-1,3-dioxan(5)yl) butyl methacrylate, 4-(2-vinyl-5-ethyl-1,3-dioxan(4)yl) butyl acrylate, 4-(2-vinyl-4,5-dimethyl-1,3-dioxan(4)yl) ethyl acrylate, 5-(2-vinyl-1,3-dioxan(4)yl) hexyl acrylate, 4-(2-isopropenyl-4,5,6-trimethyl-1,3-dioxan(4)yl) butyl acrylate, 3-(2-isopropenyl-6-ethyl-1,3-dioxan(4)yl) propyl methacrylate, 4-(2-vinyl-4,5,6-trimethyl-1,3-dioxan(5)yl) butyl acrylate, 2-vinyl-6,6-diethyl-1,3-dioxan(4)yl) methyl methacrylate, 2-(2-isopropenyl-5,5,6-trimethyl-1,3-dioxan(4)yl) ethyl acrylate, 2-(2-vinyl-4,6-diethyl-1,3-dioxan(5)yl) ethyl methacrylate, 8-(2-isopropenyl-6-butyl-1,3-dioxan(4)yl) octyl acrylate, and the like.

The bifunctional cyclic acetals of the present invention can be polymerized either in bulk or dissolved in an inert organic solvent using known ionic catalysts or they can be polymerized using known free radical catalysts. When polymerized by means of free radical catalysts both functional groups, i.e., the alkenyl acetal group as well as the unsaturated acid group, enter into the polymerization to result in a cross-linked polymeric material; however, if the bifunctional cyclic acetals are polymerized by means of an ionic catalyst, substantially only the alkenyl acetal group polymerizes, leaving the unsaturated acid group free for reaction at a later time. The polymerization with ionic catalysts therefore allows the formation of alkenyl addition polymers of any desired degree of polymerization that can be rapidly air dried into cross-linked coatings on inclusion of a free radical forming material such as a peroxide or can be cross-linked by baking without the use of an added free radical forming compound. Ionic catalysts which are suitable for the polymerization of the bifunctional cyclic acetals through the alkenyl acetal group are known in the art and include such materials as boron trifluoride, boron trifluoride etherate, stannic chloride, aluminum chloride, calcium chloride, and zinc chloride. The preferred ionic catalyst is boron trifluoride etherate. in polymerizing the bifunctional cyclic acetals of the present invention it was discovered that hydroxyl group containing compounds enhance the polymerization rate and thus act as co-catalysts. Any hydroxyl group containing compound can be employed as a co-catalyst. Since the monomers normally are inhibited with an alcohol to prevent the polymerization of the acid group through a free radical mechanism it is generally not necessary to add the co-catalyst.

The polymerization can be carried out at temperatures of −100° C. to +100° C. but is preferably carried out at temperatures of 0 to 40° C. The period of the reaction is dependent upon the reaction temperature and the desired degree of polymerization as measured in terms of resin viscosity. Typical reaction times to attain resins of brushable viscosities, if run at 25° C., are sixteen to twenty-four hours. The concentration of the ionic catalyst in the reaction mixture can be varied from 0.1 to 10.0% by weight of the monomer, but is preferably employed in a range of 1 to 5.0%. Although the reaction can be carried out in the presence of an inert solvent, such as an aromatic hydrocarbon, it has been found that solvents are not necessary to obtain resins which are useful in coating compositions. Aromatic hydrocarbons as well as halogenated hydrocarbons are solvents which are particularly suitable to dissolve either the monomer and/or the ionic polymers of the present invention. In order to effectively suppress the polymerization of the unsaturated acid group, it is necessary to carry out the polymerization of the alkenyl group with the ionic catalyst in the presence of free radical polymerization inhibitors, such as mentioned hereinabove.

In forming the resinous coating composition using the bifunctional cyclic acetals of the present invention, it is not necessary that all of the bifunctional cyclic acetals be in the polymerized form. Particularly if it is desired to coat a substrate with the resinous composition of the present invention in the absence of a solvent for the resin, it is highly desirable to polymerize the cyclic acetal only partially and apply the composition in the form of a polymer-in-monomer solution. Such polymer-in-monomer solutions allow the forming of coating compositions of any desired viscosity depending on the particular application involved.

The bifunctional cyclic acetals of the present invention may furthermore be copolymerized with ethylenically unsaturated monomers that are polymerizable with ionic catalysts such as styrene, isobutylene and similar vinyl monomers. Particularly preferred comonomers are vinyl dioxolanes and vinyl dioxanes which do not contain the unsaturated acid group. Although such copolymers do not cross-link as readily as the homopolymers of the bifunctional cyclic acetals, when heated or exposed to the atmosphere in the presence of a free radical forming curing agent, such copolymerization may enhance other physical and chemical properties of the polymer.

The liquid polymeric coating compositions of the present invention may be modified by the addition of driers, pigments, etc. in accordance with prior art methods. For air drying compositions it is generally preferred to add a peroxide or similar free radical forming compound to allow rapid cross-linking.

Alternatively cross-linking can also be accomplished by baking at elevated temperature or by exposure to actinic radiation.

The preparation of the bifunctional cyclic acetals and their polymerization is further illustrated by the following examples. Unless otherwise noted all quantities are expressed in units of weight.

Example 1

To a two-liter, three-necked flask fitted with an eight-inch Vigreux column, topped with a variable take-off head, a stirrer and a thermometer, were charged 344 grams (2 moles) of 2-vinyl-4-(4-hydroxybutyl)-1,3-dioxolane, 400 g. (4 moles) of methyl methacrylate, 15 g. of monomethyl ether of hydroquinone as stabilizer for the methyl methacrylate, and 20 g. of a solution of 5% sodium in methanol, as the catalyst for the transesterification. The mixture was heated to reflux and the methanol-methyl methacrylate azeotrope was removed by distillation at a reflux ratio of five to one. After two hours, 5 g. of monomethyl ether of hydroquinone and 20 g. of 5% sodium in methanol were added and the distillation continued until the vapor temperature reached 99° C. and the solution temperature reached 128° C. Methyl methacrylate was continuously added to the reaction mixture to replace the volume of distillate removed. The reaction mixture was filtered and the excess methyl methacrylate was removed from the filtrate by distillation at reduced pressure. The residual liquid was distilled between 118° and 120° C. at 0.8 mm. mercury pressure. The distillate was a mixture of the desired bifunctional cyclic acetal and the cyclic acetal alcohol. The alcohol was removed by filtering the mixture through a column of activated alumina. A yield of 364 g., or 76% of 4-(2-vinyl-1,3-dioxolan(4)yl) butyl methacrylate was obtained.

Example 2

Using the procedure and equipment of Example 1, 186 g. of 2-isopropenyl 4-(4-hydroxybutyl)-1,3-dioxolane was reacted with 200 g. of methyl methacrylate and 6.2 g.

of the monomethyl ether of hydroquinone. Instead of the sodium in methanol catalyst, 2 g. of tetrabutyl titanate was employed as the transesterification catalyst. A 61.5% yield of 4-(2-isopropenyl-1,3-dioxolan(4)yl) butyl methacrylate was obtained.

Example 3

Into a one-liter three-necked flask fitted with a six-inch Vigreux column and a variable take-off head, a stirrer and a thermometer, were charged 172 g. (2 moles) of methyl acrylate, 172 g. (1 mole) of 2-vinyl-4-(4-hydroxybutyl)-1,3-dioxolane, 7.5 g. of monomethyl ether of hydroquinone and 10 g. of 5% sodium in methanol solution. The mixture was heated to reflux and the methanol methyl acrylate azeotrope was removed at a reflux ratio of 5:1. Methyl acrylate was added to the reaction to replace the volume of distillate removed. After two hours, 10 g. of the catalyst solution and 3.7 g. of the monomethyl ether of hydroquinone were added to the reaction. When the vapor temperature reached 99° C. and the liquid temperature reached 125° C., the reaction was stopped and the mixture filtered. Excess methyl acrylate was removed by distillation at reduced pressure and a mixture of the desired bifunctional cyclic acetal and the cyclic acetal alcohol was removed by distillation at 123° to 133° C. at 1 mm. mercury pressure. The alcohol was removed from the bifunctional cyclic acetal by filtering the mixture through a column of activated alumina. The yield of 4-(2-vinyl-1,3-dioxolan(4)yl) butyl acrylate was 101 g.

Example 4

Employing the procedure and equipment of Example 1, 2-vinyl-5-ethyl-1,3-dioxan(5)yl methyl methacrylate is prepared from 2-vinyl-5-ethyl-5-hydroxymethyl-1,3-dioxane and methyl methacrylate. The product is distilled and 100° to 110° C. at 2 to 3 mm. mercury pressure and the starting alcohol is removed from the product by filtration through a column of activated alumina. A 66% yield of 2-vinyl-5-ethyl-1,3-dioxan(5)yl methyl methacrylate is obtained.

Example 5

To a three-necked flask fitted with a dropping funnel, a stirrer, and a reflux condenser were charged 13.0 g. (0.1 mole) of the cyclic acetal obtained from glycerine and acrolein, 10.1 g. (0.1 mole) of triethylamine to neutralize the hydrogen chloride by-product, and 130 ml. of benzene. The flask was placed in an ice bath and 9.1 g. (0.1 mole) of acryloyl chloride was added through the dropping funnel over a period of 30 minutes while keeping the reaction between 20° and 25° C. Upon completion of the addition of acryloyl chloride, the reaction mixture was heated to reflux for a period of two hours. Upon cooling, 100 ml. of one normal aqueous sodium hydroxide was added to dissolve the triethyl amine hydrochloride which had formed. The benzene layer was dried over magnesium sulfate, filtered and stripped. Upon vacuum distillation, two fractions were collected, having boiling points at 68° to 70° C. at 1 mm. mercury pressure, and 80° to 95° C. at 1 mm. mercury pressure. The first fraction comprised principally 2-vinyl-1,3-dioxan(5)yl acrylate and the second fraction comprised principally 2-vinyl-1,3-dioxolan(4)yl methyl acrylate. The yield, based on the starting material, was 87%.

Example 6

Employing the procedure and equipment of Example 1, a 44% yield of a mixture of 2-vinyl-1,3-dioxan(5)yl acrylate and 2-vinyl-1,3-dioxolan(4)yl methyl acrylate was obtained employing the cyclic acetal obtained by the condensation of acrolein and glycerine and ethyl acrylate.

The polymerization of the bicyclic functional acetals of the present invention is illustrated by the following examples:

Example 7

To a stirred reaction vessel were charged 100 parts of 4-(2-vinyl-1,3-dioxolan(4)yl) butyl methacrylate, stabilized with hydroquinone and 2 parts of boron trifluoride etherate. The vessel was cooled until the initial exothermic reaction had subsided and then was stirred for 20 hours at room temperature. To the reaction mixture was then added 100 parts of benzene, 50 parts of 10% aqueous sodium bicarbonate, and 50 parts of saturated brine solution, and the reaction mixture was agitated to remove the boron trifluoride etherate catalyst. The benzene layer was separated and dried over magnesium sulfate. After distillation of the benzene at reduced pressure, a light yellow resin, having a viscosity of 2.5 stokes was obtained. Analysis of the resin showed it to be a mixture of poly(4-(2-vinyl-1,3-dioxolan(4)yl) butyl methacrylate) and 4-(2-vinyl-1,3-dioxolan(4)yl) butyl methacrylate.

Example 8

To a stirred reaction vessel were charged 100 parts of 2-vinyl-5-ethyl-1,3-dioxan(5)yl methyl methacrylate stabilized with hydroquinone and 2 parts of boron trifluoride etherate. The reaction was stirred at room temperature for 72 hours, after which time the product was worked up as described in Example 7. The yellow product comprising a mixture of poly (2-vinyl-5-ethyl-1,3-dioxan(5)yl methyl methacrylate) and 2-vinyl-4-ethyl-1,3-dioxan(5)yl methyl methcarylate had a viscosity of 0.9 stokes.

Example 9

To a stirred reaction vessel were charged 100 parts of 4-(2-vinyl-1,3-dioxolan(4)yl) butyl methacrylate, 8 parts of 2-vinyl-4(4-hydroxybutyl)-1,3-dioxolane and 2 parts of boron trifluoride etherate. After stirring for 18 hours at room temperature, the produce was worked up as described in Example 1. The light yellow polymeric product had a viscosity of 4.3 stokes and was a copolymer of the two cyclic acetals.

Example 10

To 10 parts of the resin described in Example 7 were added 0.09 part of cobalt naphthenate as a drier and 0.15 part of a 60% solution of methyl ethyl ketone peroxide in dimethyl phthalate as a cross-linking agent. A film of about 0.03 inch in thickness was drawn down. The film was non-transferable in 3.5 hours and foil-free in six hours. After 24 hours the film had good resistance to solvent and scratching.

Example 11

The resin described in Example 8 was mixed with the cobalt dryer and the peroxide as described in Example 10. A film was drawn down. The film was non-transferable after standing overnight and was foil-free after 26 hours. The film was resistant to chemical attack and scratching.

Example 12

The resin described in Example 9 was mixed with the cobalt drier and the peroxide as shown in Example 10. A film was drawn down. The film attained a foil-free dryness in five hours. After 24 hours the film had a Sward Rocker hardness of 46.

Example 13

To a stirred reaction vessel was charged 25 g. of 4-(3 - isopropenyl - 1,3 - dioxolan(4)yl) butyl methacrylate containing 100 p.p.m. of hydroquinone and 0.50 g. of boron trifluoride etherate. The reaction mixture was stirred at room temperature for about 22 hours. The reaction product was worked up as shown in Example 7 and a light colored polymer of the dioxolanyl butyl methacrylate was obtained which was insoluble in hexane.

The example was repeated employing 4-(2-propyl-1,3-dioxolan(4)yl) butyl methacrylate. No polymer was formed and the reaction product was soluble in hexane, showing it to be the starting material. This illustrates the selective polymerization of the cyclic acetals of the present invention through the vinyl group.

Example 14

To a stirred reaction vessel maintained at 0° by placing it into an ice bath were charged 15.0 g. of 4-(2-vinyl-1,3-dioxolan(4)yl) butyl methacrylate, and 5 grams of styrene. The catalyst, comprising 0.3 ml. of boron trifluoride etherate, was added over a 30 second period. The reaction vessel was kept in the ice bath for 30 minutes and then transferred to a 25° C. bath for 90 minutes. The reaction was diluted with 30 ml. of ether and the catalyst was killed by the addition of 0.5 ml. of ammonium hydroxide. The ether solution was dried over magnesium sulfate and filtered to result in a clear solution. The ether was then evaporated out. A copolymer of the cyclic acetal and styrene weighing 18.4 g., having a viscosity of 2.05 stokes was obtained.

Example 15

To the resin of Example 14 was added 0.05% of cobalt naphthenate and 1% of a 60% solution of methyl ethyl ketone peroxide in dimethyl phthalate. A film of about 0.003 inch thickness was drawn down. The film was non-transferable in 4 to 5 hours and tack-free after standing overnight.

The foregoing examples have illustrated the formation of the novel bifunctional cyclic acetals of the present invention, their conversion to coating resins through polymerization of the alkenyl acetal group, leaving the unsaturated acid group free for further reaction and the use of such compositions to form air drying coating compositions which readily cross-link at atmospheric conditions when containing incorporated therein a free radical forming compound such as a peroxide. The methods specifically illustrated in the foregoing examples are equally applicable to the formation of other bifunctional cyclic acetals within the scope of the invention as described hereinabove as are the polymerization techniques described in the examples to other bifunctional cyclic acetals of the present invention. The utility of the resins of the present invention in forming air drying coating compositions is illustrated in the foregoing examples. These compositions can also be cross-linked without the added peroxide by baking or by actinic radiation. It is to be understood, however, that the utility of the monomers and the polymers of the present invention is not limited to such air drying compositions. Thus, the monomers may be employed as cross-linking agents, per se, in other polymeric systems.

The invention has been described with particular reference to preferred embodiments thereof, but it will be understood that variations and modifications can be effected within the scope and spirit of the invention as described hereinabove and as defined in the appended claims.

What is claimed is:

1. The addition polymer of a bifunctional cyclic acetal having the formula

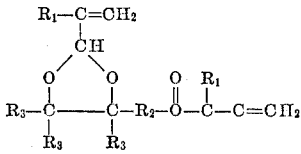

or

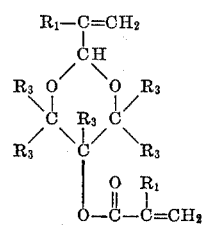

or

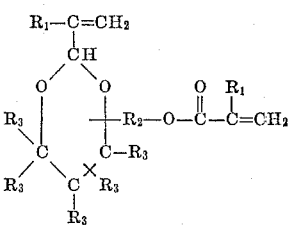

wherein $R_1$ is a radical selected from the class consisting of hydrogen and methyl groups, $R_2$ is an alkylene radical of 1 to 18 carbon atoms and $R_3$ is a radical selected from the class consisting of hydrogen and alkyl radicals containing from 1 to 8 carbon atoms, obtained by polymerization with an ionic catalyst.

2. The addition polymer of a 1,3-dioxolan(4)yl alkylene ester of $\alpha,\beta$-ethylenically unsaturated hydrocarbon acids having from 3 to 4 carbon atoms, wherein the alkylene group contains from 1 to 18 carbon atoms, said dioxolanyl group being bonded in the 2-position to the unsaturated carbon atom of a terminally unsaturated alkenyl group of 2 to 3 carbon atoms, obtained by polymerization with an ionic catalyst.

3. The polymer of claim 2 wherein the $\alpha,\beta$-ethlenically unsaturated hydrocarbon acid is acrylic acid.

4. The polymer of claim 2, wherein the $\alpha,\beta$-ethylenically unsaturated acid is methacrylic acid.

5. The polymer of claim 2 wherein the alkenyl group is an ethenyl group.

6. The polymer of claim 2 wherein the alkenyl group is an isopropenyl group.

7. The polymer of claim 2 wherein the alkylene group is a butylene group.

8. The addition polymer of a 1,3-dioxan(5)yl alkylene ester of $\alpha,\beta$-ethylenically unsaturated hydrocarbon acids having from 3 to 4 carbon atoms, wherein the alkylene group contains from 1 to 18 carbon atoms, said dioxanyl group being bonded in the 2-position to the unsaturated carbon atom of a terminally unsaturated alkenyl group of 2 to 3 carbon atoms, obtained by polymerization with an ionic catalyst.

9. The addition polymer of a 1,3-dioxan(5)yl ester of $\alpha,\beta$-ethylenically unsaturated acids having from 3 to 4 carbon atoms, said dioxanyl group being bonded in the 2-position to the unsaturated carbon atom of a terminally unsaturated alkenyl group of 2 to 3 carbon atoms, obtained by polymerization with an ionic catalyst.

10. The polymer of claim 8, wherein the alkylene group is a methylene group.

11. The addition polymer of 2-vinyl-5-ethyl-1,3-dioxan(5)yl methyl methacrylate obtained by polymerization with an ionic catalyst.

12. The addition polymer of 4-(2-vinyl-1,3-dioxolan(4)yl) butyl methacrylate obtained by polymerization with an ionic catalyst.

13. The addition copolymer of the cyclic acetal of claim 1 and a comonomer capable of addition polymerization using boron trifluoride.

14. The copolymer of claim 13 wherein the comonomer is styrene.

15. A coating composition comprising the addition polymer of claim 1 dissolved in unpolymerized cyclic acetal as defined in claim 1.

16. A coating comprising the cross-linked composition of claim 15.

17. The process of polymerizing a cyclic acetal having formulas selected from the class consisting of:

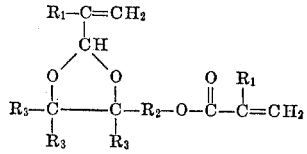

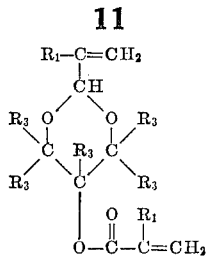

and

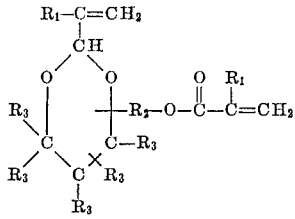

wherein $R_1$ is a radical selected from the class consisting of hydrogen and the methyl group, $R_2$ is an alkylene radical of 1 to 18 carbon atoms, and $R_3$ is a radical selected from the class consisting of hydrogen and alkyl radicals having from 1 to 8 carbon atoms, which comprises polymerizing said cyclic acetal in the presence of 0.1 to 10 percent by weight of the cyclic acetal of an ionic catalyst.

18. The process of claim 17, wherein the catalyst is boron trifluoride etherate.

19. The process of claim 17, wherein the polymerized acetal is subsequently further polymerized by addition of a free radical forming catalyst.

20. The process of claim 19, wherein the free radical catalyst is a peroxide.

References Cited

UNITED STATES PATENTS

| | | | |
|---|---|---|---|
| 2,680,735 | 6/1954 | Fegley et al. | 260—88.3 |
| 2,924,607 | 2/1960 | Pattison | 260—88.3 |
| 3,184,441 | 5/1965 | Fang | 260—340.9 |
| 3,242,151 | 5/1966 | Porret | 260—88.3 |
| 3,256,254 | 6/1966 | Reinhardt | 260—88.3 |
| 3,267,084 | 8/1966 | Rankin et al. | 260—88.3 |
| 3,271,377 | 9/1966 | Mantell et al. | 260—88.3 |
| 3,291,860 | 12/1966 | Nordstrom | 260—340.7 |

JOSEPH L. SCHOFER, *Primary Examiner.*

H. WONG, *Assistant Examiner.*